United States Patent
Karns

(10) Patent No.: US 10,370,848 B2
(45) Date of Patent: Aug. 6, 2019

(54) DAMPER FRAME

(71) Applicant: Columbia Insurance Company, Omaha, NE (US)

(72) Inventor: Jesse Karns, Mission Viejo, CA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 15/624,015

(22) Filed: Jun. 15, 2017

(65) Prior Publication Data
US 2017/0362848 A1 Dec. 21, 2017

Related U.S. Application Data

(60) Provisional application No. 62/350,853, filed on Jun. 16, 2016.

(51) Int. Cl.
*E04B 1/98* (2006.01)
*E04B 2/70* (2006.01)
(Continued)

(52) U.S. Cl.
CPC .............. *E04B 1/98* (2013.01); *E04B 2/706* (2013.01); *E04H 9/021* (2013.01); *E04H 9/024* (2013.01);
(Continued)

(58) Field of Classification Search
CPC ........... E04H 9/021; E04H 9/02; E04H 9/024; E04H 9/028; E04H 9/027; E04H 9/029; E04B 2/706; E04B 1/98
See application file for complete search history.

(56) References Cited

U.S. PATENT DOCUMENTS 4,039,050 A    8/1977  Bowling et al.
5,134,818 A *  8/1992  Van Parera ............ E01D 19/04
                                                52/167.1
(Continued)

FOREIGN PATENT DOCUMENTS

CA    2 932 026 A1    6/2015
CN    106285139 A     1/2017
(Continued)

OTHER PUBLICATIONS

Schott, et al., Sustainability in Soft Weak Open Front Buildings, 10th National Conference on Earthquake Engineering, Earthquake Engineering Research Institute, dated Jul. 21-25, 2014, pp. 10.
(Continued)

*Primary Examiner* — Babajide A Demuren
(74) *Attorney, Agent, or Firm* — Stinson LLP

(57) ABSTRACT

A damper frame includes a structural frame and a damper assembly secured to the structural frame. The damper assembly includes a damper support secured to the structural frame. A damper is secured to the damper support. A diagonal link is secured to the structural frame. A lever is secured to the damper support and the damper. The lever is pivotally connected to the diagonal link so displacement of the diagonal link is amplified and transferred to the damper. The damper support includes a laterally-extending cantilevered portion and the damper is secured to the damper support at the cantilevered portion.

17 Claims, 2 Drawing Sheets

(51) Int. Cl.
  *E04H 9/02* (2006.01)
  *F16F 15/02* (2006.01)
  *F16F 15/023* (2006.01)
  *E04B 2/58* (2006.01)
(52) U.S. Cl.
  CPC ............ *F16F 15/02* (2013.01); *F16F 15/023* (2013.01); *E04B 2/58* (2013.01); *E04H 2009/026* (2013.01); *F16F 2230/0005* (2013.01)

(56) References Cited

U.S. PATENT DOCUMENTS

| | | | | |
|---|---|---|---|---|
| 5,788,182 | A * | 8/1998 | Guimbal | B64C 27/001 |
| | | | | 244/17.11 |
| 5,870,863 | A | 2/1999 | Taylor | |
| 6,164,915 | A * | 12/2000 | Certain | B64C 27/001 |
| | | | | 248/123.11 |
| 6,247,275 | B1 | 5/2001 | Taylor | |
| 6,371,456 | B1 * | 4/2002 | Ritchie | B60N 2/501 |
| | | | | 248/550 |
| 6,438,905 | B2 | 8/2002 | Constantinou | |
| 6,672,573 | B2 | 1/2004 | Berton | |
| 6,712,374 | B2 * | 3/2004 | Assier | B62K 25/286 |
| | | | | 280/284 |
| RE39,159 | E * | 7/2006 | Klassen | B62K 25/286 |
| | | | | 280/283 |
| 7,441,376 | B2 * | 10/2008 | Ishimaru | E01D 19/00 |
| | | | | 248/636 |
| 8,677,699 | B2 * | 3/2014 | Tagawa | E04H 9/021 |
| | | | | 188/380 |
| 8,733,774 | B2 * | 5/2014 | Graney | B62K 25/286 |
| | | | | 280/284 |
| 8,857,110 | B2 | 10/2014 | Constantinou et al. | |
| 9,145,185 | B1 * | 9/2015 | Claro | B62K 25/286 |
| 9,580,924 | B1 | 2/2017 | Taylor et al. | |
| 9,732,517 | B1 | 8/2017 | Huang | |
| 9,821,879 | B2 * | 11/2017 | Hoogendoorn | B62K 25/286 |
| 2010/0293873 | A1 | 11/2010 | Mualla | |
| 2010/0313496 | A1 * | 12/2010 | Rahimian | E04H 9/02 |
| | | | | 52/167.3 |
| 2013/0174495 | A1 * | 7/2013 | Krishnan | E04B 1/98 |
| | | | | 52/1 |
| 2015/0136939 | A1 * | 5/2015 | Haselden | H05K 7/1497 |
| | | | | 248/608 |
| 2016/0298352 | A1 | 10/2016 | Agha Beigi et al. | |
| 2016/0319499 | A1 * | 11/2016 | Annan | E01D 19/00 |
| 2017/0207608 | A1 * | 7/2017 | Eder | H02B 1/54 |

FOREIGN PATENT DOCUMENTS

| | | |
|---|---|---|
| JP | 2015152166 A | 8/2015 |
| KR | 1020060087106 | 5/2007 |
| KR | 1017922460000 | 10/2017 |
| WO | 03097968 A1 | 11/2003 |
| WO | 2011029749 A1 | 3/2011 |
| WO | 2018062736 A1 | 4/2018 |

OTHER PUBLICATIONS

Sigahr et al., Scissor-Jack-Damper Energy Dissipation System, Earthquake Spectra, vol. 19, No. 1, dated Feb. 2003, pp. 133-158.

* cited by examiner

US 10,370,848 B2

DAMPER FRAME

CROSS REFERENCE TO RELATED APPLICATION

This application claims priority to U.S. Provisional Application No. 62/350,853, filed Jun. 16, 2016, the entire contents of which are hereby incorporated by reference.

FIELD OF THE INVENTION

The present invention generally relates to seismic protection for building systems, and more specifically to systems and methods for dissipating seismic energy.

BACKGROUND

In the construction of buildings, structural damage often provides energy dissipation over the course of a seismic event. Using structural damage to dissipate energy allows structures to be economically constructed. Dampers can be used to provide energy dissipation to structures, allowing structures to survive seismic events with little to no structural damage. The addition of viscous damping to wood framed structures can significantly increase seismic resistance and reduce building lateral displacements, thereby reducing damage to the structure. Although damping can be an effective method to reduce damage to a structure, viscous dampers have seen relatively little use in certain types of structures. Stiff low-rise structures, such as light-framed wood residential structures, have not been good candidates for damping because the effectiveness of the dampers is reduced due to the low displacement input into the dampers. At the point sufficient displacement and velocity is input into the damper, the structural damage due to that displacement is already significant. In addition, space for placement of dampers in light-framed wood residential structures is limited, as there is a growing demand for numerous windows and open floor plans. Placement of dampers in a horizontal position provides good displacement and energy dissipation, but takes up significant space. To use narrower frames, dampers are often positioned diagonally in a damper frame. The diagonal orientation of dampers in the frames results in a reduction of displacement to the dampers when compared to the displacement of the building because the damper is not aligned with the horizontal shifting associated with the seismic activity, thereby making the dampers less effective and less economical. In addition to reducing the displacement, the diagonal configuration amplifies the force in the damper, resulting in a need for a larger more costly damper.

SUMMARY

One aspect of the invention is a damper frame including a structural frame and a damper assembly secured to the structural frame. The damper assembly includes a damper support secured to the structural frame. A damper is secured to the damper support adjacent a first end of the damper. A diagonal link is secured to the structural frame. A lever is secured to the damper support and the damper adjacent a second end of the damper opposite the first end of the damper. The lever is connected to the diagonal link so displacement of the diagonal link relative to the damper support is amplified and transferred to the second end of the damper by the lever. The damper support includes a laterally-extending cantilevered portion and the damper is secured to the damper support at the cantilevered portion.

Another aspect of the invention is a damper assembly for dissipating seismic energy in a structural frame. The damper assembly includes a damper support and a damper secured to the damper support adjacent a first end of the damper. A lever is secured to the damper support and the damper adjacent a second end of the damper opposite the first end of the damper. A diagonal link is connected to the lever so displacement of the diagonal link relative to the damper support is amplified and transferred to the second end of the damper by the lever. The damper support comprises a laterally-extending cantilevered portion and the damper is secured to the damper support at the cantilevered portion.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
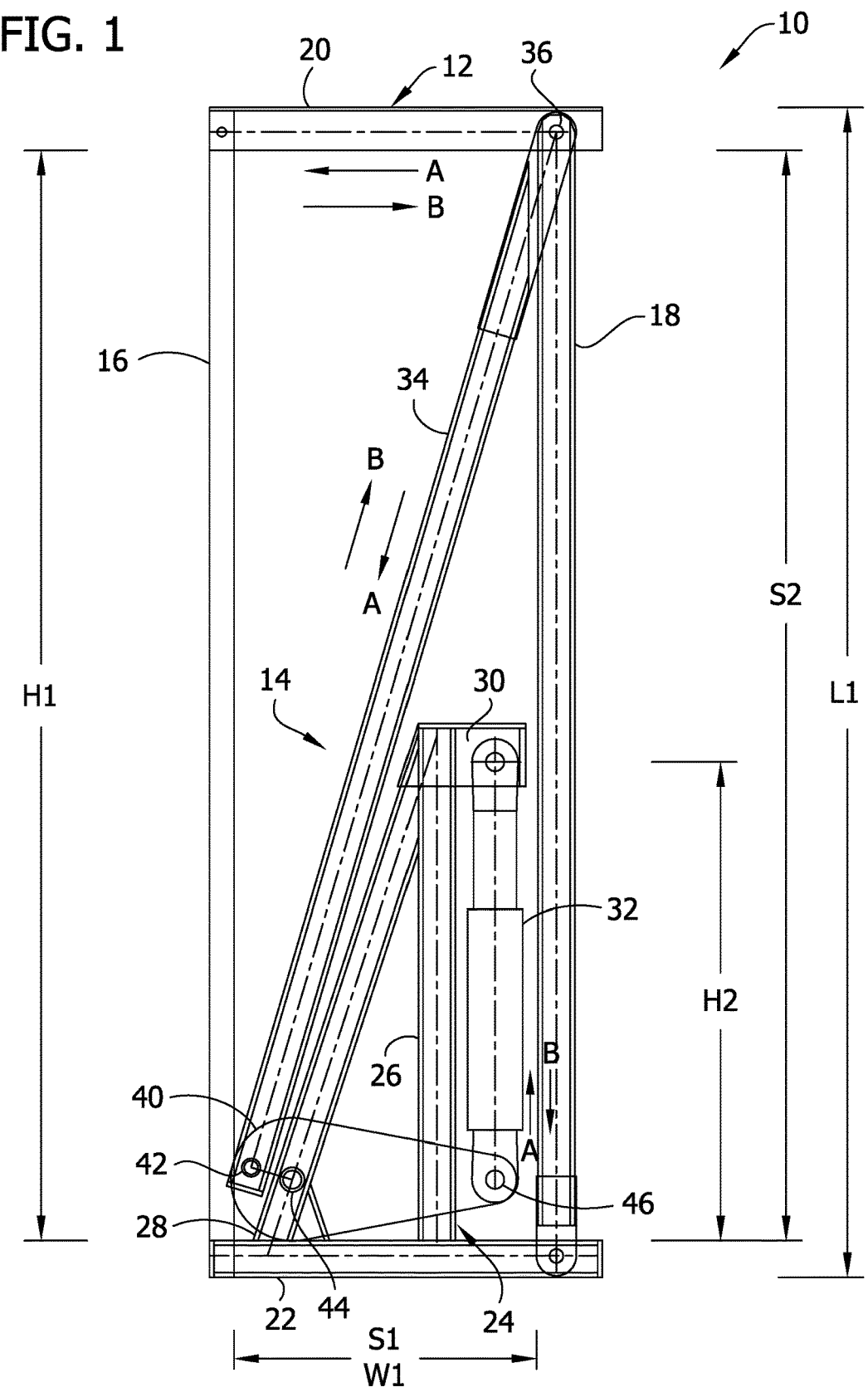
FIG. 1 is a front elevation of one embodiment of a damper frame for use in light-framed structures.
Figure 2:
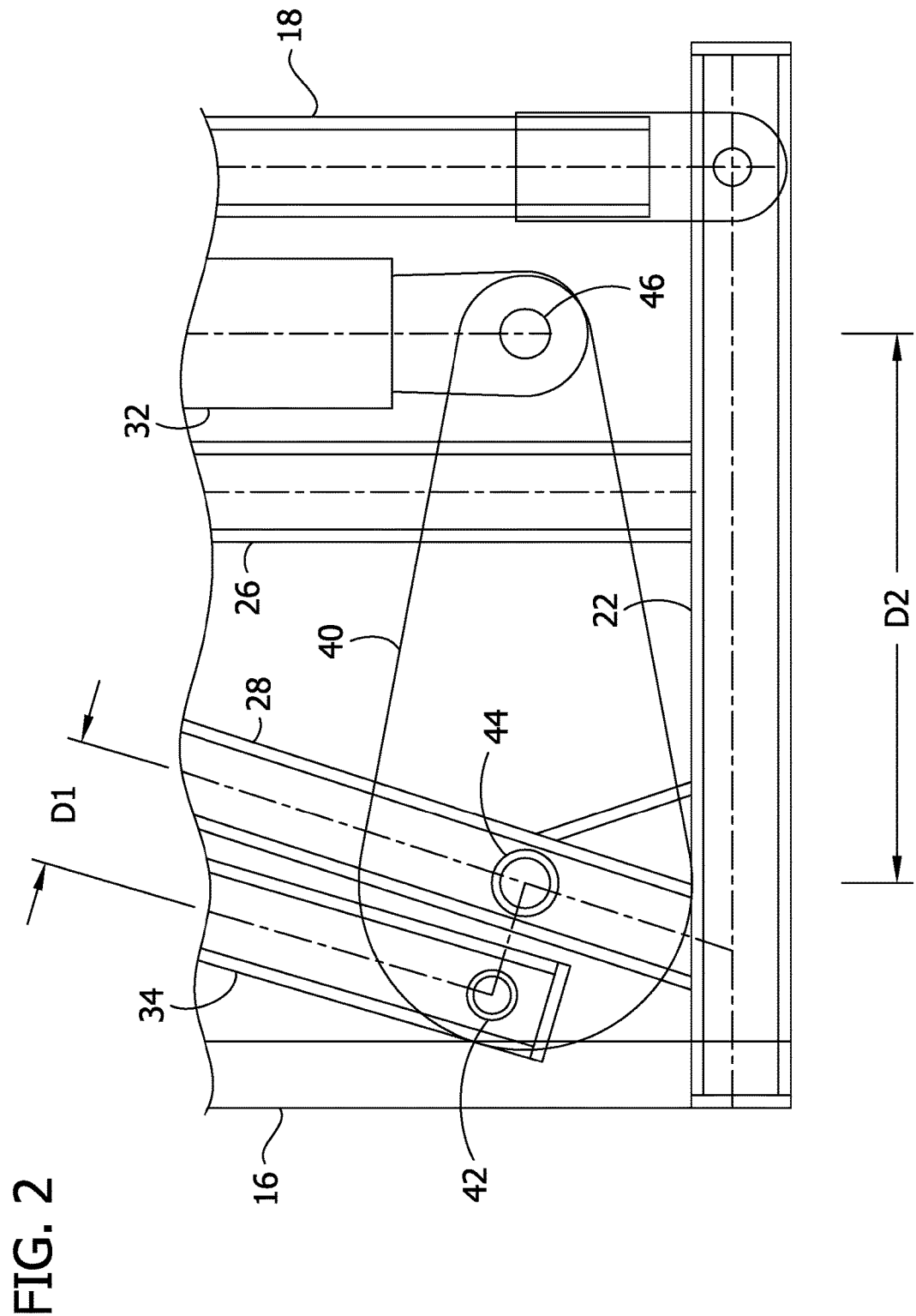
FIG. 2 is an enlarged, fragmentary front elevation of a damper assembly of the damper frame of FIG. 1.

Referring to FIGS. 1 and 2, a first embodiment of a damper frame is generally indicated at 10. The damper frame 10 includes a structural frame 12 and a damper assembly 14 configured to dissipate forces in a building structure that includes the structural frame (e.g., forces due to seismic activity). The structural frame 12 is a generally rectangular frame including first and second vertical structural members (left and right members, respectively) 16, 18 and first and second horizontal structural members (top and bottom members, respectively) 20, 22 each secured to both of the vertical structural members. As illustrated, the length L1 of the vertical members 16, 18 is greater than the spacing S1 between them. Relatedly, the generally rectangular shape of the area enclosed by the structural frame 12 has a height H1 that it greater than is width W1. For example, the ratio of the length L1 of the vertical structural members 16, 18 to the spacing S1 between them is suitably at least 2, and more suitably about 3. The spacing S1 between the vertical structural members 16, 18 is suitably no more than about 4 feet, and more suitably no more than about 3 feet. The structural frame 12 in the illustrated embodiment is sized and shaped so it can be installed in a wall within a single story of a building (e.g., in a single story building or on one of the floors of a multi-story building). For example, the spacing S2 between the horizontal structural members 20, 22 (which is equal to the length L1 of the vertical structural members 16, 18 in the illustrated embodiment) is suitably in the range of about 7 feet to about 12 feet (e.g., about 8 feet). It is understood that the top and bottom members 20, 22 may extend laterally beyond the vertical support members 16, 18. The structural members 16, 18, 20, 22 can be light gauge steel members, or any other suitable structural members. Other arrangements of the structural frame are within the scope of the present invention.

Referring to FIGS. 1 and 2, the damper assembly 14 includes a damper support 24 rigidly secured to the structural frame 12. In the illustrated embodiment, the damper support 24 is rigidly secured to the bottom structural member 22 of the structural frame 12. The damper support 24 is generally triangular and includes a first leg 26 and a second leg 28 secured to each other at a location between the horizontal structural supports 20, 22. The first leg 26 suitably extends generally upward from the bottom structural member 22 (e.g., substantially perpendicularly from the bottom structural member). The second leg 28 extends at a non-perpendicular angle to the first leg 26. The first and second legs 26, 28 of the support 24 are rigidly secured to the structural frame 12 and to each other. The damper support 24 also includes a cantilevered portion 30 extending laterally toward one of the vertical structural supports 16, 18 (e.g., the right vertical support as illustrated in FIG. 1). In the embodiment illustrated in FIGS. 1-2, the cantilevered portion 30 of the damper support 24 is a plate extending laterally from the junction of the first and second legs 26, 28 of the damper support 24 at the top of the damper support. The cantilevered portion 30 the damper support 24 extends from the junction of the first and second legs 26, 28 to a location adjacent one of the vertical structural members 16, 18 (e.g., the right vertical structural member 18) and the second leg 28 extends angularly downward from the junction between the first and second legs 26, 28 to a location adjacent the opposite vertical structural member (e.g., the left vertical structural member 16) where the second leg is secured to the bottom structural member 22. The first and second legs 26, 28 can be light gauge steel members, such as high-strength steel tube (e.g., square tube). Other configurations are within the scope of the present invention.

The damper assembly 14 includes a damper 32 (broadly, shock-absorbing member). The damper 32 can be a seismic damper, such as a fluid viscous damper, or any other suitable shock-absorbing member configured to dissipate energy. The damper 32 is secured to the cantilevered portion 30 of the damper support 24 adjacent a first end of the damper. The first end of the damper 32 is thereby secured to the damper assembly 14 at a location adjacent the vertical structural member 18. The damper 32 extends from the cantilevered portion 30 downward in a space between the vertical structural support 18 and the damper support 24. The cantilevered portion 30 of the damper support 24 supports the first end of the damper 32 at a substantially fixed location spaced between the horizontal structural members 20, 22. The distance H2 between the bottom structural member 22 and the location where the cantilevered portion 30 of the damper support 24 supports the first end of the damper 32 is based on the length of the damper which is related to the capacity and expected movement of the damper. For example, the distance H2 is suitably at least about 2 feet, and more suitably at least about 2.5 feet.

The damper assembly 14 also includes a diagonal link 34. The diagonal link 34 is secured to the structural frame 12 and extends angularly inward into the space enclosed by the members 16, 18, 20, 22 of the structural frame. The diagonal link 34 is secured to the structural frame 12 in a manner that transfers seismic energy from the structural frame 12 to the diagonal link 34 during a seismic event. As illustrated in FIG. 1, for example, the diagonal link 34 is pivotally secured to the structural frame 12 at pivot point 36 adjacent a juncture of two structural members (e.g., at a corner of the structural frame). In the illustrated embodiment, the diagonal link 34 is pivotally secured to the structural frame at a juncture of the top structural member 20 and the right vertical structural member 18. The diagonal link 34 is thereby connected to the structural frame 12 at a location that is generally above the damper 32 and extends inward toward the vertical structural member 16 opposite the vertical structural member 18 that the damper is adjacent. The diagonal link 34 extends diagonally along a length of the structural frame 12 (e.g., generally toward the corner opposite the corner where it is secured to the structural frame 12). A second end of the diagonal link 34 opposite the first end is free from direct attachment to the structural frame 12. In the illustrated embodiment, the diagonal link 34 is substantially parallel to the second leg 28 of the damper support 24. The diagonal link 34 is suitably a steel tube (e.g., a high-strength steel square tube), although other configurations are within the scope of the present invention.

The damper assembly 14 includes a swing arm or lever 40. In the embodiment illustrated in FIGS. 1 and 2, the lever 40 is a metal plate, such as a 0.5 inch thick steel plate, extending alongside the damper support 24. Preferably, an identical lever (not shown) is aligned with the lever 40 and extends alongside the opposite side of the damper support 24 so that forces are distributed between the two levers. The lever 40 is connected to the diagonal link 34 so that movement of the diagonal link 34 requires movement of the lever. For example, the lever 40 is suitably pivotally connected to the diagonal link 34 at pivot point 42 (e.g., adjacent the second end of the diagonal link). The lever 40 is pivotally connected to the damper support 24 at pivot point 44. As illustrated in FIGS. 1 and 2, for example, the lever 40 is pivotally connected to the second leg 28 of the damper support 24 at pivot point 44. The lever 40 is also pivotally connected to the damper 32 at pivot point 46 adjacent a second end of the damper, which is opposite the end of the damper that is connected to the cantilevered portion 30 of the damper support. Thus, the lever 40 is pivotally secured to the diagonal link 34, the damper support 24, and the damper 32. The position of the pivot point 44 where the lever 40 is connected to the damper support 24 is substantially fixed, while the pivot points 42 and 46 can move as the lever 40 pivots about pivot point 44. Pivoting movement of the lever 40 in this manner requires the damper 32 to move between extended and retracted positions. Thus, the lever 40 is positioned and arranged so that movement of the diagonal link 34 relative to the damper support 24 (e.g., during a seismic event) results in dissipation of energy by the damper 32. The lever 40, along with the rest of the damper assembly 14, is thereby configured to transfer energy from the diagonal link 34 (e.g., kinetic energy associated with movement of the diagonal link during a seismic event) through the lever to the damper 32 where it is dissipated.

The pivot point 42 where the diagonal link 34 is connected to the lever 40 is spaced a distance D1 (see FIG. 2) from the fixed pivot point 44 along an axis extending perpendicular to a longitudinal axis of the diagonal link 34. The pivot point 46 where the damper 32 is connected to the lever 40 is spaced a distance D2 from the fixed pivot point 44 along an axis extending perpendicular to a longitudinal axis of the damper 32. During movement of the structural frame 12 (e.g., due to seismic forces), the displacement of the diagonal link 34 is amplified by the lever 40 by a ratio of D2 to D1 as the lever 40 transfers the displacement into the damper 32. In one embodiment, D1 is about 3.5 inches and D2 is about 16.5 inches, for an amplification of about 4.7:1. More generally, the ratio of D1 to D2 is suitably at least about 3, and more suitably at least about 4.

The pivot point 46 where the lever 40 is connected to the damper 32 is generally underneath the cantilevered portion 30 of the damper support 24, where the damper is connected to the damper support. The damper 32 is not horizontal in orientation. The damper 32 is oriented so the vertical distance between the first and second ends of the damper is greater than the lateral distance between the first and second ends of the damper. Relatedly, the angle A1 formed between the axis of the damper 32 and the horizontal structural supports 20, 22 is suitably greater than about 45 degrees, more suitably greater than about 60 degrees, more suitably greater than about 75 degrees, and still more suitably greater than about 85 degrees. As seen in FIG. 1, the damper 32 is suitably positioned substantially vertically in the structural frame 12 (i.e., the longitudinal axis of the damper extends vertically). In other words the angle A1 between the axis of the damper 32 and horizontal is about 90 degrees in the embodiment illustrated in FIG. 1.

A line between the connection 44 between the lever 40 and the damper support 24 and the connection between the lever and the damper 32 is substantially perpendicular to a line of action of the damper 32 when the damper assembly 14 is a rest (i.e., when the damper assembly 14 is not subjected to seismic energy or other forces). The lever 40 is thereby arranged so that when the lever begins to pivot about pivot point 44, the initial movement of the damper is aligned with the line of action of the damper. This facilitates efficient transfer of energy from the lever 40 into the damper 32. This arrangement of the lever 40 and damper 32 also minimizes lateral movement of the damper (i.e., movement of the damper in a direction perpendicular to its line of action) in response to seismic energy. Minimizing lateral movement of the damper also facilitates using a structural frame 12 that does not take up much lateral space. Moreover, this arrangement also facilitates use of a smaller, less expensive damper.

The vertical orientation of the damper 32 allows the damper frame 10 to be narrower in configuration than prior damper assemblies that included a horizontal damper, while still providing effective seismic energy dissipation. Because the damper assembly 14 is configured to magnify the displacement of the diagonal link 34 due to the mechanical advantage provided by the lever 40, the damper assembly is configured to amplify the velocity of the damper 32 through its cyclic motion during a seismic event. In addition, the damper assembly 14 is configured to reduce the amount of force exerted on the damper 32. The increase in displacement and velocity and the decrease in the amount of force acting on the damper 32 permit the use of a smaller and less expensive damper in the damper assembly 14. The narrower damper frame 10 and the smaller and less expensive damper facilitate use of the damper frame in light-framed buildings, such as wood framed buildings.

Referring to FIG. 1, when a structure including the damper frame 10 experiences a seismic event, the ground displacement causes the top structural member 20 to move horizontally relative to the bottom structural member 22. This movement distorts the structural frame 12 and causes the diagonal link 34 to move relative to the damper support 24. As the top structural member 20 moves in the direction of arrow A relative to the bottom structural member 22, the parts of the damper assembly 14 will move in corresponding directions designated by arrows A. As illustrated, when the top structural member 20 moves to the left, it pushes down on the diagonal link 34, which pushes down on the lever 40 at pivot point 42, causing the opposite end of the lever (e.g., at pivot point 46) to move upward. Conversely, when the top structural member 20 moves in the direction of arrow B relative to the bottom structural member 22, the parts of the damper assembly 14 will move in corresponding directions designated by arrows B. Although the displacement of the diagonal link 34 relative to the damper support 24 is less than the displacement of the top and bottom structural support members 20, 22, the lever 40 amplifies the displacement of the diagonal link as it is transferred into the damper 32. The lever 40 also amplifies the velocity as it is transferred into the damper 32, resulting in a reduction of the amount of force exerted on the damper. The force exerted on the damper 32 is resolved through the damper support 24 into the ground or foundation of a building to which the damper frame 10 is secured. The amplified displacement and velocity permits the damper 32 to dissipate more energy. The higher velocity and lower force requirement for the damper 32 results in an effective use of the damper, permitting the smaller damper to dissipate the same energy as a larger damper in a conventional chevron brace or toggle brace damper assembly. This effective use of the damper 32 also allows the damper to be positioned in a vertical or near vertical orientation in the damper frame 10, which permits a narrower frame 12 to be used to dissipate the same amount of seismic energy. Space for installing damping devices in light-framed structures is limited, so the narrower frame 12 facilitates use of the damper frame 10 in light-framed structures and similar structures where use of damper frames for seismic energy dissipation was previously incompatible with design requirements, or at least not favored in the industry.

The damper frame 10 can be sold and shipped to customers as an assembled damper frame (e.g., as seen in FIG. 1). Alternatively, the damper frame 10 can be sold and shipped to customers as a disassembled kit. The damper assembly 14 can be sold and shipped to customers separately, for use in any structure without requiring the structural frame 112 as shown.

The damper frame 10 is useful in residential construction, such as single family and multi-family residences, and in other light-framed structures. Multiple damper frames can be used in the construction of a building. If the damper frames are shipped to a construction site already assembled, the possibility of miscalculation or incorrect connection in the field is reduced. The damper frame 10 can be used in addition to and/or in place of other energy dissipation elements, such as shear walls and moment frames. The damper frame 10 offers several advantages in the construction of single or multi-level residential buildings. Because these buildings are smaller than commercial buildings (e.g., about 1-5 stories) and are wooden structures, typical damper frames with wide profiles and utilizing large, heavy, expensive dampers are not appropriate. The damper frame 10 has a narrow profile to permit use in light-framed buildings. The damper frame 10 amplifies forces to the damper to permit use of smaller, lighter, and cheaper dampers. Some convention energy dissipation elements are permanently deformed during a seismic event to dissipate the energy. In comparison, the damper frame 10 can be used over and over, as there is no permanent deformation required to dissipate energy.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A damper frame comprising:
a structural frame; and
a damper assembly secured to the structural frame, the damper assembly comprising:
a damper support secured to the structural frame;
a damper secured to the damper support adjacent a first end of the damper;
a diagonal link secured to the structural frame; and
a lever secured to the damper support and the damper adjacent a second end of the damper opposite the first end of the damper, the lever being connected to the diagonal link so displacement of the diagonal link relative to the damper support is amplified and transferred to the second end of the damper by the lever,
wherein the damper support comprises a laterally-extending cantilevered portion and the damper is secured to the damper support at the cantilevered portion.

2. The damper frame of claim 1 wherein the damper has a substantially vertical orientation within the structural frame.

3. The damper frame of claim 1, wherein the lever is pivotally secured to the damper support at a first location, pivotally secured to the diagonal link at a second location spaced a first distance from the first location, and pivotally secured to the damper at a third location spaced a second distance from the first location, the ratio of the second distance to the first distance being at least about 3.

4. The damper frame of claim 3 wherein the ratio of the second distance to the first distance is at least about 4.

5. The damper frame of claim 1, wherein the damper has a line of action and a line extending between the location where the lever is connected to the damper support and the location where the lever is connected to the damper is substantially perpendicular to the line of action of the damper.

6. The damper frame of claim 1, wherein the first end of the damper is spaced vertically from the second end of the damper by a distance that is greater than a lateral distance between the first and second ends of the damper.

7. A damper assembly for dissipating seismic energy in a structural frame, the damper assembly comprising:
a damper support;
a damper secured to the damper support adjacent a first end of the damper;
a lever secured to the damper support and the damper adjacent a second end of the damper opposite the first end of the damper; and
a diagonal link connected to the lever so displacement of the diagonal link relative to the damper support is amplified and transferred to the second end of the damper by the lever,
wherein the damper support comprises a laterally-extending cantilevered portion and the damper is secured to the damper support at the cantilevered portion;
wherein the lever is pivotally secured to the damper support at a first location, pivotally secured to the diagonal link at a second location spaced a first distance from the first location, and pivotally secured to the damper at a third location spaced a second distance from the first location, the ratio of the second distance to the first distance being at least about 3.

8. The damper assembly of claim 7 wherein the ratio of the second distance to the first distance is at least about 4.

9. The damper assembly of claim 7, wherein the damper has a line of action and a line extending between the location where the lever is connected to the damper support and the location where the lever is connected to the damper is substantially perpendicular to the line of action of the damper.

10. The damper assembly of claim 7 wherein the first end of the damper is spaced vertically from the second end of the damper by a distance that is greater than a lateral distance between the first and second ends of the damper.

11. A damper frame comprising:
a generally rectangular structural frame includes a vertical left structural member, a vertical right structural member, a horizontal top structural member extending between the left and right structural members, and a horizontal bottom structural member spaced from the horizontal top structural member and extending between the left and right structural members; and
a damper assembly secured to the structural frame, the damper assembly comprising:
a damper support secured to the structural frame;
a damper secured to the damper support adjacent a first end of the damper;
a diagonal link secured to the structural frame; and
a lever secured to the damper support and the damper adjacent a second end of the damper opposite the first end of the damper, the lever being connected to the diagonal link so displacement of the diagonal link relative to the damper support is amplified and transferred to the second end of the damper by the lever,
wherein the damper support comprises a laterally-extending cantilevered portion and the damper is secured to the damper support at the cantilevered portion.

12. The damper frame of claim 11, wherein the diagonal link is connected to the structural frame in a manner such that movement of the top structural member relative to the bottom structural member during a seismic event causes displacement of the diagonal link relative to the damper support.

13. The damper frame of claim 12, wherein the damper is adjacent one of the vertical structural members.

14. The damper frame of claim 11, wherein the diagonal link is pivotably secured to the structural frame.

15. The damper frame of claim 14, wherein the diagonal link is secured to the structural frame adjacent to the connection between one of the vertical structural members and one of the horizontal structural members.

16. The damper frame of claim 15, wherein an end of the diagonal link is pivotally secured to one of the vertical structural members and one of the horizontal structural members at the connection between said one vertical structural member and said one horizontal structural member.

17. The damper frame of claim 16, wherein the diagonal link extends across the structural from the end pivotably secured to one of the vertical structural members and one of the horizontal structural members toward the connection between the other vertical structural member and other horizontal structural member.

* * * * *